(12) United States Patent
Tanaka et al.

(10) Patent No.: US 8,908,036 B2
(45) Date of Patent: Dec. 9, 2014

(54) IMAGE-CAPTURING DEVICE AND IN-VEHICLE CAMERA

(75) Inventors: Chihiro Tanaka, Kanagawa (JP); Hiroshi Takemoto, Kawasaki (JP); Mitsuru Nakajima, Atsugi (JP); Shinobu Kanatani, Atsugi (JP); Kohei Shimizu, Ebina (JP); Norihiko Sasaki, Hanamaki (JP)

(73) Assignee: Ricoh Company, Ltd., Tokyo (JP)

( * ) Notice: Subject to any disclaimer, the term of this patent is extended or adjusted under 35 U.S.C. 154(b) by 391 days.

(21) Appl. No.: 13/037,571

(22) Filed: Mar. 1, 2011

(65) Prior Publication Data

US 2011/0216195 A1 Sep. 8, 2011

(30) Foreign Application Priority Data

Mar. 5, 2010 (JP) .................. 2010-048898

(51) Int. Cl.
*H04N 7/18* (2006.01)
*H04N 5/225* (2006.01)

(52) U.S. Cl.
CPC ........... *H04N 5/2253* (2013.01); *H04N 5/2254* (2013.01); *H04N 5/2257* (2013.01)
USPC .. 348/148; 348/373; 348/E7.085; 348/E5.024

(58) Field of Classification Search
None
See application file for complete search history.

(56) References Cited

U.S. PATENT DOCUMENTS

| | | | |
|---|---|---|---|
| 5,783,815 A * | 7/1998 | Ikeda | .................. 250/208.1 |
| 6,693,751 B2 | 2/2004 | Morii et al. | |
| 6,740,949 B2 | 5/2004 | Andoh et al. | |
| 7,200,624 B2 | 4/2007 | He et al. | |
| 7,528,880 B2 | 5/2009 | Yamaguchi et al. | |
| 2004/0105134 A1* | 6/2004 | Morii et al. | .................. 358/474 |
| 2005/0110873 A1 | 5/2005 | Enomoto | |

(Continued)

FOREIGN PATENT DOCUMENTS

| | | |
|---|---|---|
| EP | 2 129 104 A2 | 12/2009 |
| JP | 9-54233 | 2/1997 |

(Continued)

OTHER PUBLICATIONS

Japanese Office Action mailed on Oct. 15, 2013 for Japanese Application No. 2010-048898.

(Continued)

*Primary Examiner* — Christopher S Kelley
*Assistant Examiner* — Kaitlin A Retallick
(74) *Attorney, Agent, or Firm* — Oblon, Spivak, McClelland, Maier & Neustadt, L.L.P.

(57) ABSTRACT

An image-capturing device including: an imaging optical system which is configured to capture an optical image of a subject; an imaging optical system retaining member which retains the imaging optical system; an imaging element which is configured to convert the optical image into an electrical signal; a substrate which is arranged on a back side of the imaging optical system retaining member and retains the imaging element; and a plurality of substrate joint pieces each of which extends from the imaging optical system retaining member toward the substrate, wherein tip parts of the plurality of substrate joint pieces on a substrate side and the substrate are joined by an indirect bond structure using at least one joint intermediate member which is adhered to at least one of the tip parts of the plurality of substrate joint pieces and the substrate with an adhesive, and a fixation structure.

13 Claims, 11 Drawing Sheets

(56) References Cited

U.S. PATENT DOCUMENTS

| | | | |
|---|---|---|---|
| 2005/0251050 A1* | 11/2005 | Groot | 600/478 |
| 2007/0174358 A1 | 7/2007 | He et al. | |
| 2007/0292124 A1* | 12/2007 | Gottwald et al. | 396/419 |
| 2008/0143864 A1 | 6/2008 | Yamaguchi et al. | |
| 2009/0295985 A1* | 12/2009 | Nakamura | 348/373 |
| 2010/0067080 A1 | 3/2010 | Shimizu et al. | |
| 2010/0259616 A1 | 10/2010 | Nakajima et al. | |
| 2011/0037893 A1 | 2/2011 | Okada | |

FOREIGN PATENT DOCUMENTS

| | | |
|---|---|---|
| JP | 2003-101723 | 4/2003 |
| JP | 2003-249773 | 9/2003 |
| JP | 2003-298890 | 10/2003 |
| JP | 2004-159110 | 6/2004 |
| JP | 2005-176293 | 6/2005 |
| JP | 2006-180487 | 7/2006 |
| JP | 2006-284628 | 10/2006 |
| JP | 2007-174358 | 7/2007 |
| JP | 4541288 | 7/2010 |
| JP | 2010-263606 | 11/2010 |
| WO | WO 2009/131017 | 10/2009 |

OTHER PUBLICATIONS

Extended European Search Report issued Feb. 17, 2012 in Patent Application No. 11157066.9.

* cited by examiner

IMAGE-CAPTURING DEVICE AND IN-VEHICLE CAMERA

CROSS-REFERENCE TO THE RELATED APPLICATION

The entire contents of Japanese patent application No. JP 2010-048898, filed on Mar. 5, 2010, of which the convention priority is claimed in this application, are incorporated hereinto by reference.

BACKGROUND OF THE INVENTION

1. Field of the Invention

The present invention relates to an image-capturing device and an in-vehicle camera.

2. Description of the Related Art

An image-capturing device into which an imaging optical system and an imaging element such as a CCD image sensor are built, besides being used in a digital still camera or the like, has recently been used as well in an in-vehicle camera such as a back monitor camera (a rear view camera, a rear view monitor).

In such an imaging-capturing device, if positions of the imaging element and the imaging optical system which are positioning-adjusted with high accuracy shift, a focus position shifts and it is impossible to obtain a high-quality (clear) image. Therefore, especially in an in-vehicle camera, it is necessary to affix strongly so that the imaging element and the imaging optical system do not shift from their positions after being positioning-adjusted, to always obtain a high-quality image even under a driving environment where vibration and heat are applied, or under a hot environment such as summer.

In general, a method of bonding or a method of screw-fastening is used to adjust positions of the imaging element and the imaging optical system with high accuracy and fixing the positions strongly. However, anchorage strength equal to or more than that of the screw-fastening cannot be obtained by only bonding. Moreover, in the method by only screw-fastening, because the positioning adjustment is limited by a pitch of the screw or a position of a hole, the positioning adjustment cannot be performed with high accuracy.

Thus, a positioning fixation structure combining these two methods has been made (for example, refer to JP H09-54233 A). In JP H09-54233 A, an optical module which projects light emitted from an optical element through an optical component such as a lens has a first member which retains the optical element and a second member which retains the optical component, the first and second members are temporarily positioned through an adhesive (an elastic body) lying between them, and then an interval between the first and second members is set by a screw (an interval setting part) under a state where the adhesive is compressed, and the positioning adjustment of the optical element and the optical component (the lens) is carried out.

However, the following problems arise in the positioning adjustment described in JP H09-54233 A.

Accuracy is limited by the pitch of the screw, due to the positioning adjustment being performed with the screw. That is to say, it is impossible to freely adjust the position of the first member which retains the optical element with a device different from that for positioning adjustment of the optical module, and an accurate adjustment higher than that of the method by bonding can not be achieved. For example, when the pitch of the screw is 0.5, and its accuracy is 1/10, i.e., 0.05 mm, and the accuracy of adjustment varies depending on a screw chosen, or how finely the screw is capable of turning.

In addition, when a plurality of screws are tightened, tightening of the screws has to be carried out while performing adjustment for each screw, a position of a substrate adjusted with high accuracy shifts by differences when tightening or positioning the screw.

Moreover, when an optical axis of the optical component (the lens) is set to be in a vertical direction, an adjustment in a horizontal direction perpendicular to the vertical direction is essentially determined by the position of the screw hole, and the degree of freedom of adjustment is minimal.

In addition, when temporary positioning is carried out with the adhesive (the elastic body), a following process in which the positions of the optical element and the optical component (the lens) are adjusted accurately by the screw is preliminarily assumed. That is, two adjustments of positioning are necessary, which takes time to perform.

Thus, even if such a positioning adjustment described in JP H09-54233 A is applied to a positioning adjustment of the imaging element and the imaging optical system, the positions of the imaging element and the imaging optical system can not be strongly fixed under a state where the positions of the imaging element and the imaging optical system have been adjusted with high accuracy, and a stable and high-quality image cannot be obtained, due to the above-mentioned problems.

SUMMARY OF THE INVENTION

At least an object of the present invention is to provide an image-capturing device and an in-vehicle camera, in each of which positions of an imaging element and an imaging optical system can be strongly fixed under a state where positions of the imaging element and the imaging optical system have been adjusted with high accuracy.

In light of the above-mentioned, according to an aspect of the present invention, an image-capturing device includes: an imaging optical system which is configured to capture an optical image of a subject; an imaging optical system retaining member which retains the imaging optical system; an imaging element which is configured to convert the optical image into an electrical signal; a substrate which is arranged on a back side of the imaging optical system retaining member and retains the imaging element; and a plurality of substrate joint pieces each of which extends from the imaging optical system retaining member toward the substrate, in a surrounding of the imaging optical system, wherein tip parts of the plurality of substrate joint pieces on a substrate side and the substrate are joined by an indirect bond structure using at least one joint intermediate member which is adhered to at least one of the tip parts of the plurality of substrate joint pieces and the substrate with an adhesive, and a fixation structure which fixes at least one of the tip parts of the plurality of substrate joint pieces and the substrate using a fixing member at fixation positions different from bonding positions of the at least one joint intermediate member in the indirect bond structure.

According to a preferable embodiment of the present invention, to at least two of the plurality of substrate joint pieces which are located at symmetrical positions with respect to a center of the imaging optical system, respectively the at least one joint intermediate member is adhered, and the two joint intermediate members are adhered at symmetrical positions with respect to the center of the imaging optical system.

According to another preferable embodiment of the present invention, provided are at least two of the fixation positions each of which is respectively provided to at least two of the plurality of substrate joint pieces which are located at symmetrical positions with respect to the center of the imaging optical system.

According to a further preferable embodiment of the present invention, the at least two of the fixation positions each of which is respectively provided to the two substrate joint pieces which are located at the symmetrical positions with respect to the center of the imaging optical system are such arranged that a straight line connecting the at least two of the fixation positions becomes the shortest.

According to a further preferable embodiment of the present invention, the fixing members are provided on a straight line which passes through the center of the imaging optical system and connects the two substrate joint pieces which are located at the symmetrical positions with respect to the center of the imaging optical system with the shortest length, and are provided in the surroundings of the straight line.

According to a further preferable embodiment of the present invention, at least one rib is provided to a tip face of at least one of the plurality of substrate joint pieces.

According to a further preferable embodiment of the present invention, the fixing member is a screw, on a tip face of at least one of the plurality of substrate joint pieces a screw hole is provided at a position where the screw is screwed, and at a position of the substrate corresponding to the screw hole, a hole into which the screw is inserted is provided, and the screw is inserted into the hole of the substrate and is screwed to the screw hole of the at least one of the plurality of substrate joint pieces.

According to a further preferable embodiment of the present invention, the fixing member is a pin, on a tip face of at least one of the plurality of substrate joint pieces a pin hole into which the pin is pressed is provided, and at a position of the substrate corresponding to the pin hole, a hole into which the pin is inserted is provided, and the pin is inserted into the hole of the substrate and is pressed into the pin hole of the at least one of the plurality of substrate joint pieces.

According to a further preferable embodiment of the present invention, a projection part projecting toward the substrate is provided at a tip part of at least one of the plurality of substrate joint pieces, and a hole into which the projection part is inserted is provided at a position of the substrate corresponding to the projection part.

According to a further preferable embodiment of the present invention, the fixing member is the projection part, the projection part of the at least one of the plurality of substrate joint pieces penetrates through the penetrating hole of the substrate, and the projection part penetrated from the substrate is welded.

According to a further preferable embodiment of the present invention, the fixing member includes the projection part, and a stopper which is fitted to an outer circumference of the projection part penetrated from the substrate and has at least one rib with elasticity formed in an inner circumference thereof, the at least one rib is pressed and put into contact with the outer circumference of the projection part.

According to another aspect of the present invention, an in-vehicle camera has a structure of any one of the above-mentioned imaging-capturing devices.

BRIEF DESCRIPTION OF THE DRAWINGS

The invention will be described further below with reference to exemplary embodiments and the accompanying schematic drawings, in which.

DETAILED DESCRIPTION OF THE PREFERRED EMBODIMENTS

The present invention will be explained based on embodiments as follows.

Embodiment 1

Figure 1:
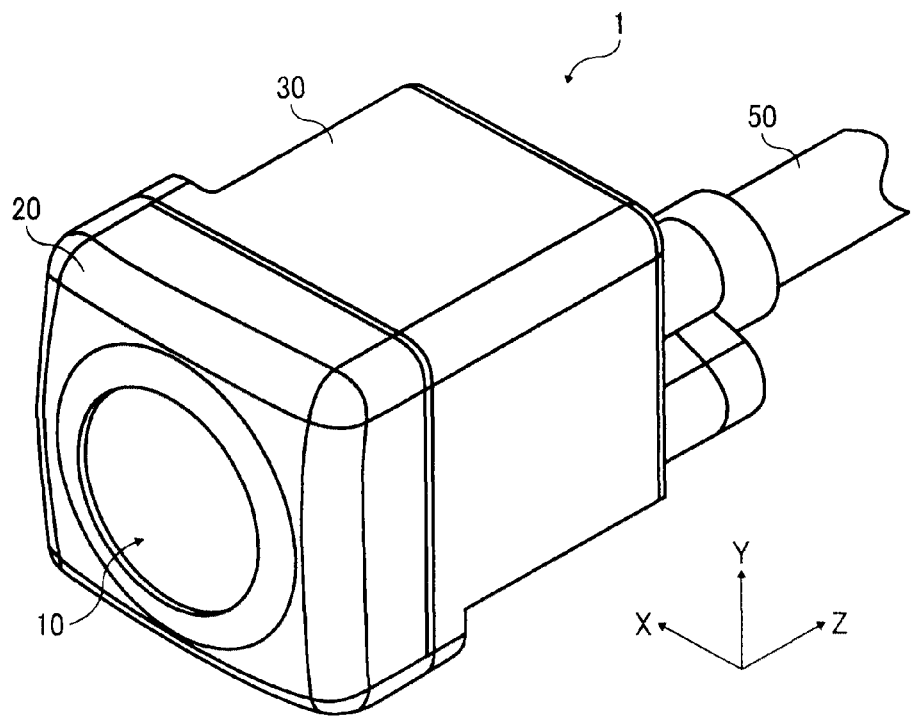
FIG. 1 is a perspective view illustrating an appearance of a front side of an image-capturing device according to Embodiment 1 of the present invention.
Figure 2:
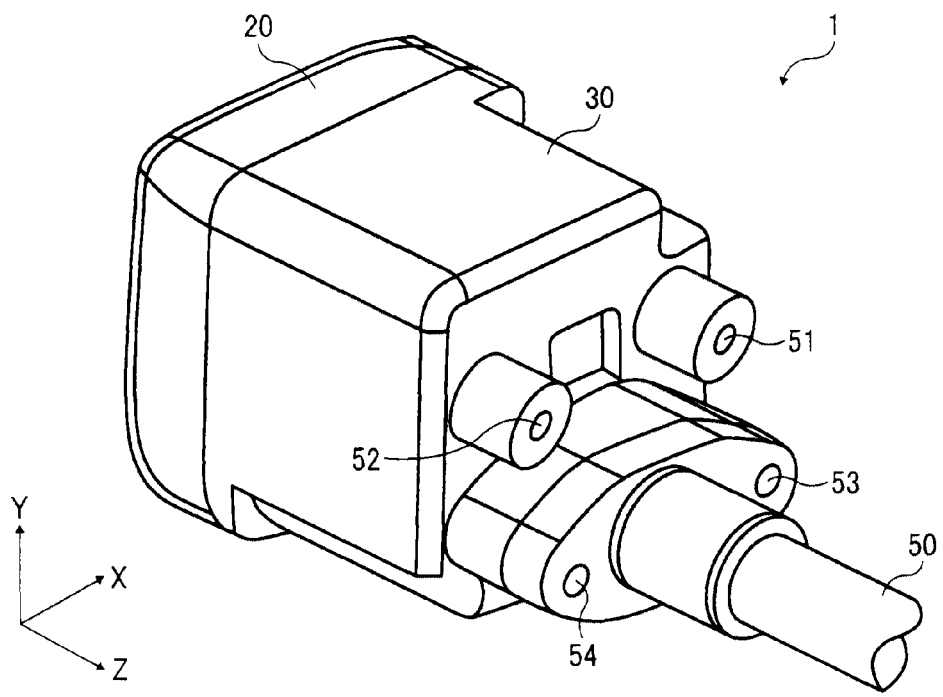
FIG. 2 is a perspective view illustrating an appearance of a back side of the image-capturing device according to Embodiment 1 of the present invention.

FIG. 1 is a perspective view illustrating an appearance of a front side of an image-capturing device according to an embodiment of the present invention. In addition, FIG. 2 is a perspective view illustrating an appearance of a back side of the image-capturing device. The image-capturing device in Embodiment 1 is an example of an application to a back monitor camera used as an in-vehicle camera. For example, the back monitor camera is set up around a number plate or the like at a rear section of a body of a vehicle (a car). And, a lower area on a rear side of the vehicle body is imaged (a moving image) by the back monitor camera, and is displayed on a display which is set up in a vehicle interior.

Figure 3:
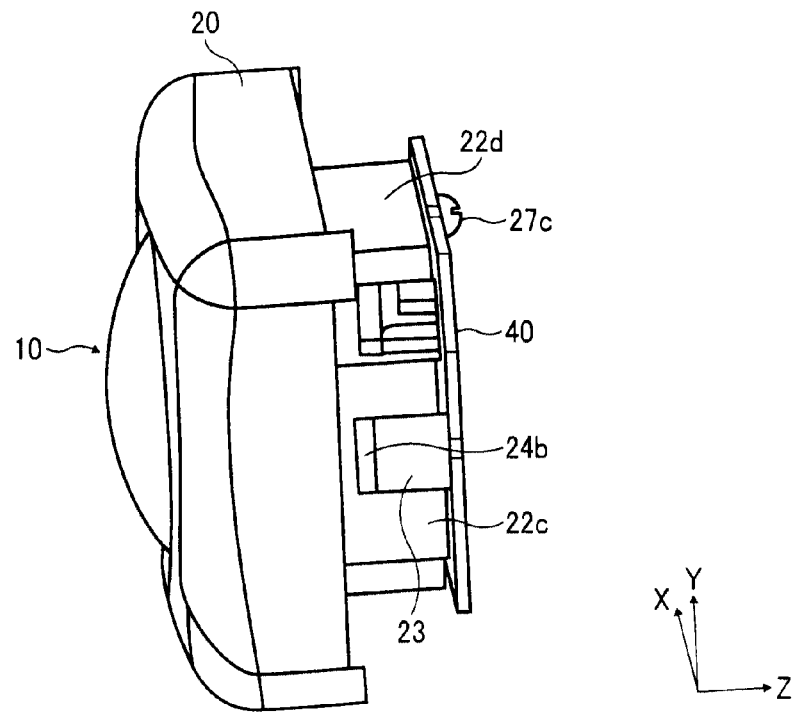
FIG. 3 is a figure illustrating the image-capturing device in a state where a cover and a connecting cord have been detached from a lens cell.
Figure 4:
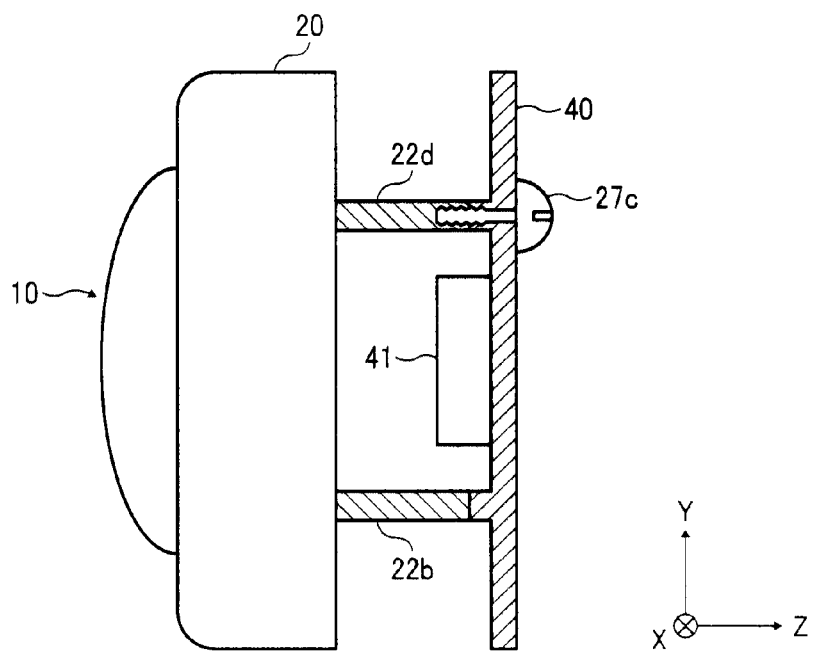
FIG. 4 is a cross-sectional view of a back side of the lens cell.

As illustrated in FIG. 1 and FIG. 2, the image-capturing device 1 (the in-vehicle camera; the back monitor camera) according to Embodiment 1 includes: an imaging lens system (an imaging optical system) 10; a lens cell 20 which is formed of a resin material and retains the imaging lens system 10 on an inner circumference side thereof; a rear case 30 which is formed of a resin material and stores a printed circuit board (hereinafter, a substrate) 40 or the like, on the printed circuit board 40 as illustrated in FIG. 3 and FIG. 4 an image sensor (an imaging element) 41 explained later being arranged; and a connecting cord 50 electrically connected to the display (not illustrated) set up in the vehicle interior.

At a back side of the image-capturing device 1 (a side of the connecting cord 50), screw holes 51 and 52 used for screwing the image-capturing device 1 to the vehicle body, and screw holes 53 and 54 used for screwing the connecting cord 50 to the rear case 30, are formed.

In FIG. 1, FIG. 2 and the following figures, a Z-axis illustrated as a coordinate axis represents a direction of an optical axis of the imaging lens system 10, a vertical direction perpendicular to the Z-axis is set to be a Y-axis, and a horizontal direction perpendicular to the Z-axis is set to be an X-axis.

FIG. 3 is a figure illustrating a state where the rear case 30 and the connecting cord 50 have been detached from the lens cell 20. Moreover, FIG. 4 is a cross-sectional view of a back side of the lens cell 20.

As illustrated in these figures, the lens cell 20 is formed integrally by resin moulding. And, the imaging lens system 10 formed by a plurality of lenses is retained on a front side in the lens cell 20. In addition, the substrate 40 on which the image sensor 41 is retained is positioned and joined (fixed) to the back side of the lens cell 20 (details of a junction structure of the lens cell 20 and the substrate 40 which is a feature of the present invention will be described later).

The image sensor 41 is an imaging element using a CCD sensor or a CMOS sensor. The image sensor 41 converts a subject image which is imaged on a light receiving surface by the imaging lens system 10 into an electrical signal. After a necessary signal processing, the electrical signal is output to the display (not illustrated) of such as a navigation device in the vehicle interior through the connecting cord 50, and is displayed on the display as an image.

Figure 5:
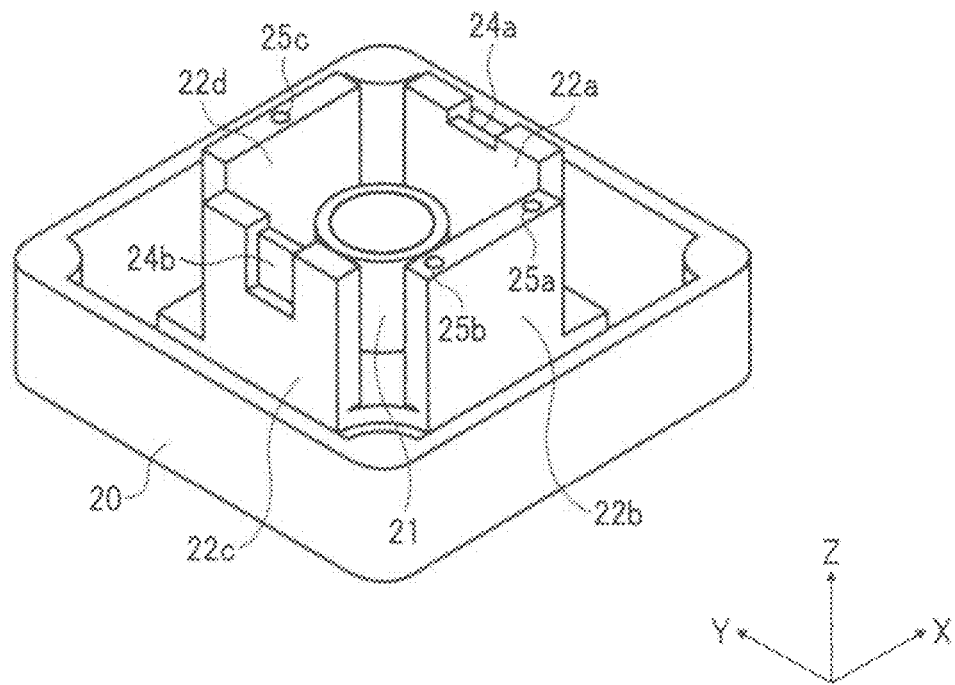
FIG. 5 is a perspective view of the lens cell viewed from the back side.

FIG. 5 is a perspective view of the lens cell 20 viewed from the back side.

As illustrated in FIG. 5, in the lens cell 20, a lens retaining frame part 21 in a cylinder shape which retains the imaging lens system 10 in its center part (refer to FIG. 1), and substrate joint walls 22a, 22b, 22c and 22d divided into four pieces which are used for fixing the substrate 40 and are arranged such that they surround an outer circumference side of the lens retaining frame part 21, are formed integrally. Each of the substrate joint walls 22a, 22b, 22c and 22d is in a projection shape.

A concave joint face 24a and a concave joint face 24b are respectively formed on outside faces of tip sides of the two substrate joint walls 22a and 22c of the four substrate joint walls 22a, 22b, 22c and 22d, which are located at positions facing each other across the lens retaining frame part 21. Joint intermediate members 23 each of which has in cross-section an approximate reverse-L shape (refer to FIG. 6) which will be explained later, are fitted to the concave joint face 24a and the concave joint face 24b respectively. That is, as illustrated in FIG. 7A, the concave joint face 24a of the substrate joint wall 22a and the concave joint face 24b of the substrate joint wall 22c are located at symmetrical positions with respect to a center (the optical axis) of the lens retaining frame part 21. In addition, the shape of each of the joint intermediate members 23 is not limited to the approximate reverse-L shape, and the joint intermediate member 23 can be formed in any shape only if one side of it has a surface fitting to the corresponding one of the concave joint faces 24a and 24b, and another side has a face bonding to an inner edge face of the substrate 40.

In addition, two screw holes 25a and 25b, and one screw hole 25c, each of which has screw ditches, are formed on tip faces of two substrate joint walls 22b and 22d respectively, the two substrate joint walls 22b and 22d of the four substrate joint walls 22a, 22b, 22c and 22d facing each other across the lens retaining frame part 21. That is, as illustrated in FIG. 7A, on an XY plane, positions of the screw holes 25a, 25b of the substrate joint wall 22b and of the screw hole 25c of the substrate joint wall 22d, are approximately at symmetrical positions with respect to the center of the lens retaining frame part 21, and the screw holes 25a, 25b of the substrate joint wall 22b are located at symmetrical positions about the Y axis direction which passes through the center (the optical axis) of the lens retaining frame part 21.

Figure 7A:
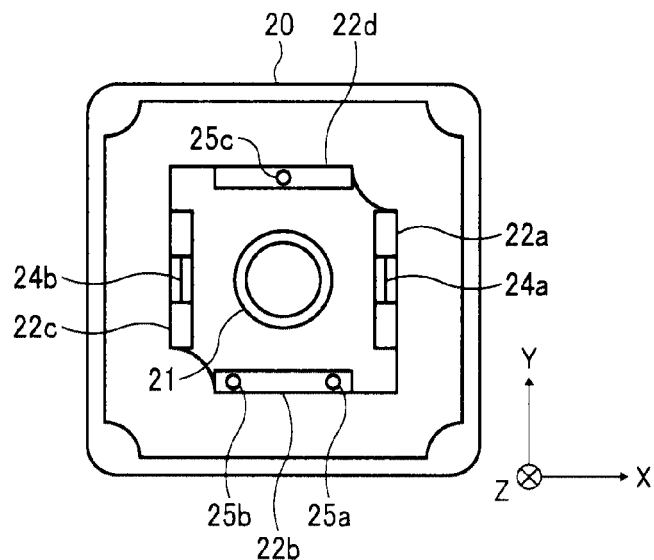
FIG. 7A is a plan view of the lens cell in Embodiment 1.
Figure 7B:
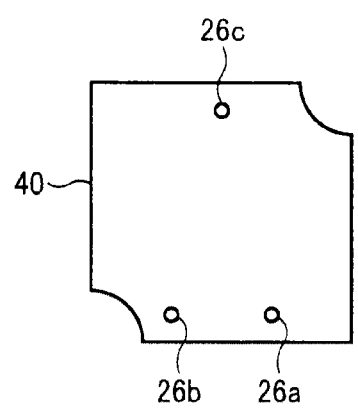
FIG. 7B is a plan view of a substrate.

As illustrated in FIG. 7B, holes 26a, 26b and 26c, each of which has a size such that a corresponding one of screws 27a, 27b and 27c (refer to FIG. 8) can be inserted, are formed on the substrate 40, corresponding to the positions of the screw holes 25a, 25b formed on the substrate joint wall 22b and 25c formed on the substrate joint wall 22d.

Next, the junction structure of the lens cell 20 and the substrate 40 on which the image sensor 41 is retained will be explained.

Figure 6:
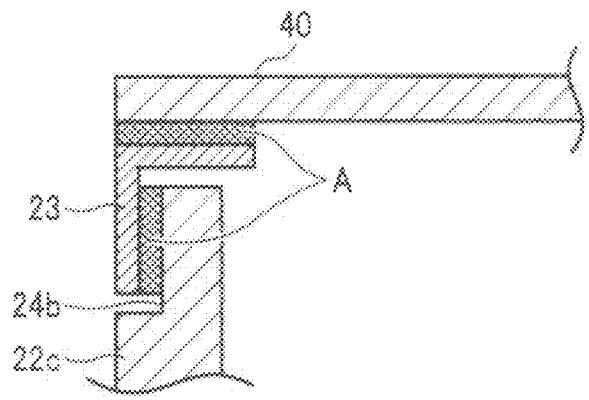
FIG. 6 is a figure illustrating an indirect bond structure bonded though a joint intermediate member.

First, as illustrated in FIG. 6, ultraviolet curing adhesive A is applied to a bonding surface of each of the joint intermediate members 23 (only one side is illustrated in FIG. 6) which is bonded to the concave joint face 24b (24a), and a bonding surface of each of the joint intermediate members 23 which is bonded to the substrate 40. And then, the one of the bonding surfaces of each of the joint intermediate members 23 is fitted and adhered to the concave joint wall 24b (24a) of the substrate joint wall 22c (22a), and the other of the bonding surfaces of each of the joint intermediate members 23 is adhered to the opposite inner edge part of the substrate 40.

That is, the substrate 40 is positioning adjusted accurately by a sensor positioning device (not illustrated) such that the optical axis of the imaging lens system 10 is aligned with a center position of the image sensor 41, and in that state a bonding treatment is carried out simultaneously. In addition, the holes 26a, 26b and 26c of the substrate 40 are adjusted to be located at the positions of the screw holes 25a, 25b of the substrate joint wall 22b and the screw hole 25c of the substrate joint wall 22d, respectively, by the positioning adjustment.

And then, ultraviolet rays are irradiated and the ultraviolet curing adhesive A is hardened, after the positioning adjustment of the substrate 40. Thus, the substrate 40 is joined (fixed) indirectly to the substrate joint walls 22a and 22c of the lens cell 20 through the joint intermediate members 23. In the present embodiment, this joint is called an indirect bond structure. Each of the joint intermediate members 23 is formed from an ultraviolet ray penetrating material.

Figure 8:
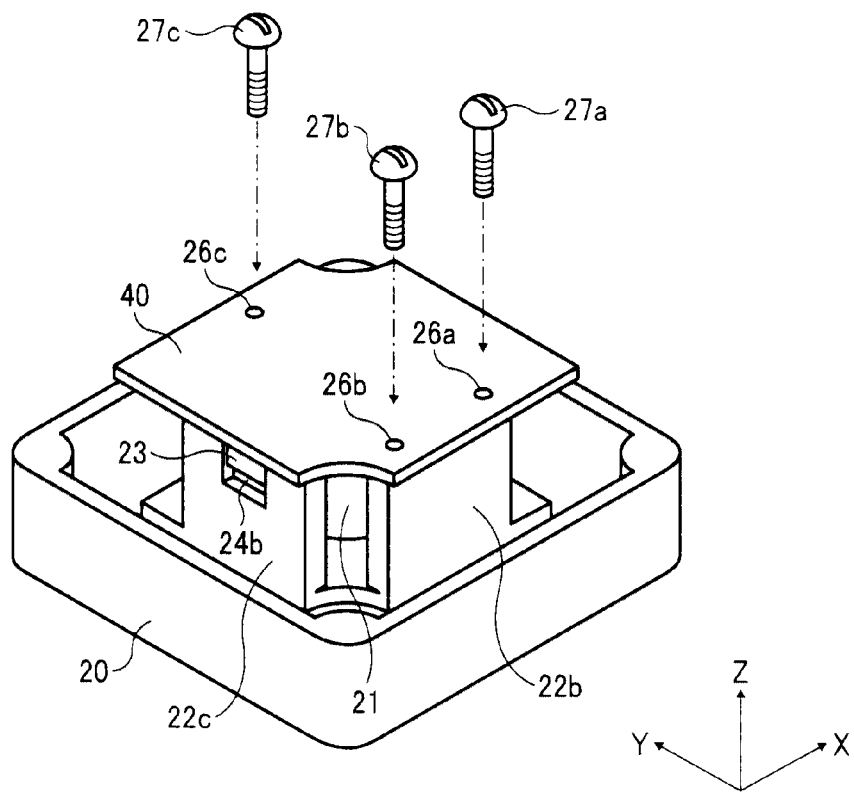
FIG. 8 is a figure illustrating a fixation structure with a screw in Embodiment 1.

And, as illustrated in FIG. 8, the screws 27a, 27b and 27c are inserted into the corresponding holes 26a, 26b and 26c of the substrate 40 respectively, and are screwed into the corresponding screw holes 25a, 25b and 25c of the substrate joint walls 22b and 22d. The substrate 40 is fixed to an end face of each of the substrate joint walls 22a, 22b, 22c and 22d of the lens cell 20, by this screw fastening, in a positioned state.

Thus, in Embodiment 1, when the lens cell 20 and the substrate 40 are joined (fixed), the substrate joint walls 22a, 22c of the lens cell 20 and the substrate 40 are indirectly joined (fixed) firstly, through the joint intermediate members 23, by the above-mentioned indirect bond structure.

An advantage of the indirect bond structure is that a thickness of the adhesive (the ultraviolet curing adhesive A) applied between the joint intermediate members 23 and the concave joint faces 24a and 24b, and between the joint intermediate members 23 and the substrate 40 can be reduced, by indirectly joining the substrate 40 positioning adjusted with high accuracy to the substrate joint walls 22a and 22c of the lens cell 20, through the joint intermediate members 23. In this way, the adhesive applied between the substrate 40 and the joint intermediate members 23, and between the concave joint faces 24a, 24b of the substrate joint walls 22a and 22c and the joint intermediate members 23 can be hardened at the same time. In this way, a relative position gap between the lens cell 20 and the substrate 40 caused by an alteration in volume of the adhesive by hardening can be offset by minute movements of the joint intermediate members 23, and the lens cell 20 and the substrate 40 can be joined (fixed) while keeping the high-accuracy positioning adjusted state.

In addition, it is preferable that the joint intermediate materials 23 which are fitted and adhered to the concave joint faces 24a and 24b of the substrate joint walls 22a and 22c respectively be located at symmetrical positions across the center (the optical axis) of the lens retaining frame part 21. In this case, bonding positions on both sides of the substrate 40 are located at symmetrical positions with respect to the center (the optical axis) of the lens retaining frame part 21, as well. In this way, both sides of the substrate 40 can be bonded symmetrically with balance, therefore the substrate 40 can be bonded while keeping the high-accuracy positioning adjusted state.

In addition, in Embodiment 1, after the substrate joint walls 22a and 22c of the lens cell 20 and the substrate 40 being joined indirectly through the joint intermediate members 23 the bonding surfaces of which are applied with the adhesive, by respectively screwing the screws 27a, 27b and 27c into the screw holes 25a, 25b and 25c formed in the substrate joint walls 22b and 22d, and fastening the substrate 40, the substrate 40 positioning adjusted with high accuracy can be strongly fixed.

With this structure, even when an environmental temperature changes greatly, a position gap between the substrate 40 (the image sensor 41) and the imaging lens system 10 in the direction of the optical axis can be controlled. Therefore, a subject image entering through the imaging lens system 10 can be imaged on the light receiving surface of the image sensor 41 with good accuracy in a focused state, and a stable and excellent image can be obtained.

In addition, because it is easy to control a tightening torque or a tightening amount for a fastening with screw, the substrate 40 can be fixed to the lens cell 20 in a state in which a certain fixed power has been given to the entire substrate 40. As a screw used to fasten the substrate 40, though it is preferable that one made of a metal be used from the point of view of hardness and durability or the like, a material other than metal is possible, only if a fixed power more than the adhesive used by the above-mentioned indirect bond structure can be provided.

Moreover, the screw holes 25a and 25b are formed in the substrate joint wall 22b of the lens cell 20 preliminarily, and the screw hole 25c is formed in the substrate joint wall 22d of the lens cell 20 preliminarily, and the holes 26a, 26b and 26c are formed at the substrate 40 corresponding to the positions of the screw holes 25a, 25b and 25c respectively. Therefore, the substrate 40 positioning adjusted with high accuracy and the lens cell 20 can be easily fastened, only by inserting the screws 27a, 27b and 27c into the screw holes 26a, 26b and 26c of the substrate 40 and tightening.

Moreover, in Embodiment 1, in a case that the substrate 40 is fastened at three points (three screws 27a, 27b and 27c) as above-mentioned, by deciding a position of the substrate 40 on the XY plane by two points (for example, the two screws 27a and 27c), and fastening while correcting and adjusting an inclination of the substrate 40 on the XY plane by remaining one point (for example, the one screw 27b), the substrate 40 can be fixed without the inclination.

Furthermore, in Embodiment 1, when the substrate 40 is fastened to the substrate joint walls 22b and 22d by the screws 27a, 27b and 27c, if a screw is tightened up too much and the substrate 40 is strongly pressed to the lens cell 20 side too much, the adhesive applied to the bonding surfaces between the joint intermediate members 23 and the substrate joint walls 22a and 22c are strongly compressed, the substrate 40 may approach the lens cell 20 side.

As a measure, when adjusting the positions of the substrate 40 and the lens cell 20, preliminarily disposing the substrate 40 to a position away from the lens cell 20 by only an amount by which the position of the substrate varies when the screw is tightened with a certain amount and the substrate 40 is pressed to the lens cell 20 side and the adhesive is compressed, rather than a position of the substrate 40 with respect to the lens cell 20 in a most focused state, and in this state, joins the substrate 40 indirectly to the lens cell 20 through the joint intermediate members 23.

Under such a state, by performing the screw tightening in a situation in which an amount by which the screws 27a, 27b and 27c are tightened is controlled to be constant, the position of the substrate 40 approaches the lens cell 20 by compression of the adhesive, and the substrate 40 can be fixed to the optimum position (a position in the most focused state).

Embodiment 2

Figure 9A:
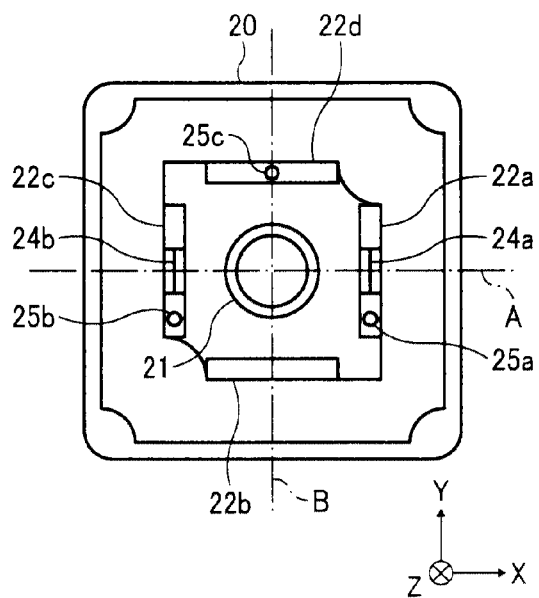
FIGS. 9A and 9B are plan views of a lens cell according to Embodiment 2 of the present invention.

Embodiment 2 is a variation on a screw fastening position when the substrate 40 is screwed and fastened to the substrate joint walls of the lens cell 20. For example, as illustrated in FIG. 9A, screw holes 25a and 25b are respectively formed in the substrate joint walls 22a and 22c where the joint intermediate members 23 are joined, and a screw hole 25c is formed in the substrate joint wall 22d.

That is, the screw hole 25c of the substrate joint wall 22d is located on a straight line B which connects middle points of the substrate joint wall 22b and the substrate joint wall 22d in a direction of the X axis, and the screw hole 25a of the substrate joint wall 22a and the screw hole 25b of the substrate joint wall 22c are arranged at symmetrical positions relative to the straight line B (positions such that a straight line connects the screw holes 25a and 25b becomes the shortest).

Figure 9B:
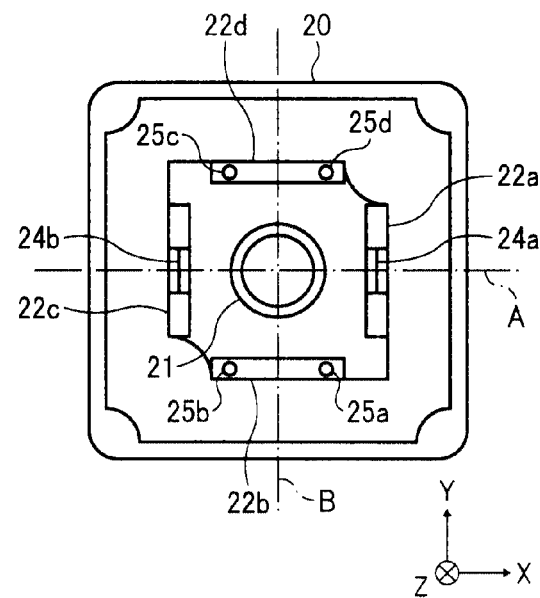

Moreover, as illustrated in FIG. 9B, two screw holes 25a and 25b are formed in the substrate joint wall 22b, and two screw holes 25c and 25d are formed in the substrate joint wall 22d.

That is, with respect to a straight line A which connects middle points of the substrate joint wall 22a and the substrate joint wall 22c in a direction of the Y axis, the screw holes 25a and 25b of the substrate joint wall 22b and the screw holes 25c and 25d of the substrate joint wall 22d are respectively arranged at symmetrical positions (positions that a straight line which connects the screw holes 25a and 25d becomes the shortest, and positions that a straight line which connects the screw holes 25b and 25d becomes the shortest).

Thus, because the substrate 40 can be screwed and fastened to the substrate joint walls of the lens cell 20 at a screw fastening position where the balance is good for the entire substrate 40, therefore, a shift amount of the substrate 40 when performing the screw fastening becomes constant over the entire substrate 40, and the entire substrate 40 can be fixed stably and strongly.

Embodiment 3

Figure 10:
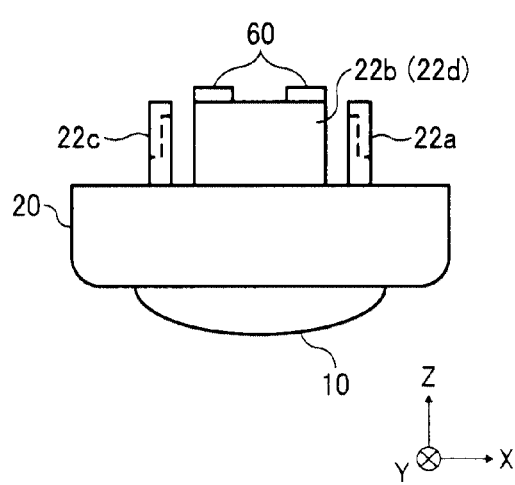
FIG. 10 is a side view of a lens cell according to Embodiment 3 of the present invention.

In Embodiment 3, as illustrated in FIG. 10, on each of the tip faces of the substrate joint walls 22b and 22d of the lens cell 20 where the substrate 40 is screw fastened, at least one minute rib 60 is formed along a direction of the optical axis of the imaging lens system 10 (a direction of the Z axis). Other structures are similar to those in Embodiment 1.

The at least one rib 60 is disposed to be located near each of the screw holes 25a, 25b and 25c of the substrate joint walls 22b and 22d. For each of the substrate joint walls 22b and 22d, it is preferable that at least two ribs 60 be arranged at symmetrical positions with respect to the optical axis. The entire substrate 40 can be kept at a same height with the ribs 60. The height of each of the ribs 60 is set in such a range that the substrate can be kept at a position where a subject image is imaged by the imaging lens system 10, on the light receiving surface of the image sensor 41 within a range of a tolerance focal shift.

With the indirect bond structure explained in Embodiment 1, after indirectly joining the substrate joint walls 22a and 22c of the lens cell 20 and the substrate 40 through the joint intermediate members 23 each bonding surface of which has been applied with the adhesive, when the substrate 40 is fastened to the substrate joint walls 22b and 22d by the screws, if a tightening amount of the screws is too great, the substrate 40 is strongly pressed to the lens cell 20 side too much, and the adhesive is strongly compressed, the substrate 40 may approach the lens cell 20 side.

Figure 11:
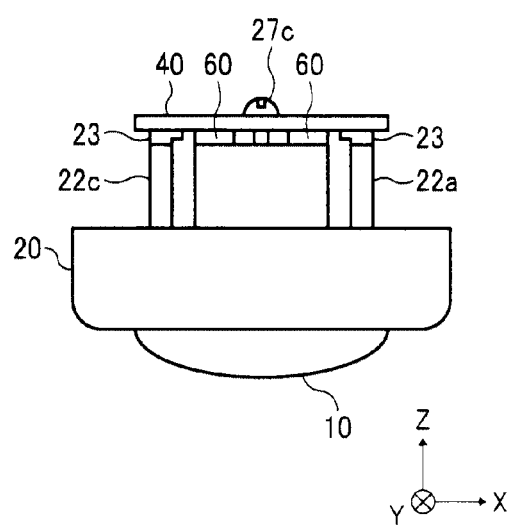
FIG. 11 is a side view illustrating a fixed state of each of substrate joint walls of the lens cell and a substrate in Embodiment 3 of the present invention.

In this case, in the present embodiment, even in a state where the tightening amount of the screws is too great and the substrate 40 is strongly pressed to the lens cell 20 side, a variation of the substrate 40 towards the lens cell 20 side is suppressed by the substrate 40 striking the ribs 60 (refer to FIG. 11), and the substrate 40 can be fixed at the optimum position.

Embodiment 4

A fixation structure in the above-mentioned Embodiment 1 is a structure in which the substrate 40 is screwed and fixed to the substrate joint walls 22b and 22d by fastening with the screws 27a, 27b and 27c. In a fixation structure of Embodiment 4, pins are used for screwing and fixing instead of the screws. Other structures are similar to those in Embodiment 1.

Figure 12:
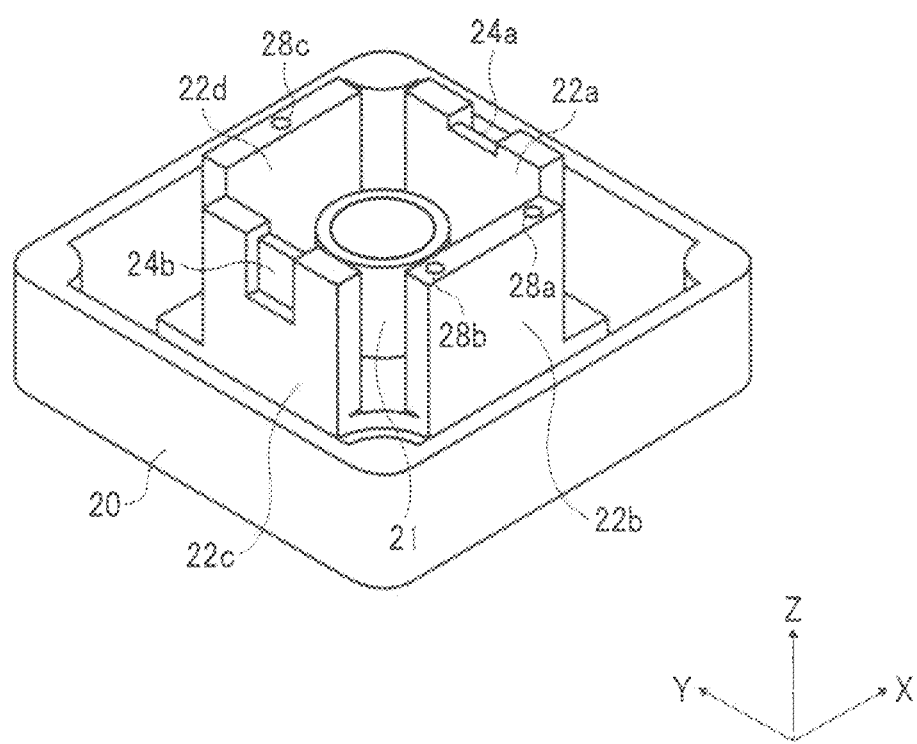
FIG. 12 is a perspective view of a lens cell viewed from a back side according to Embodiment 4 of the present invention.
Figure 13A:
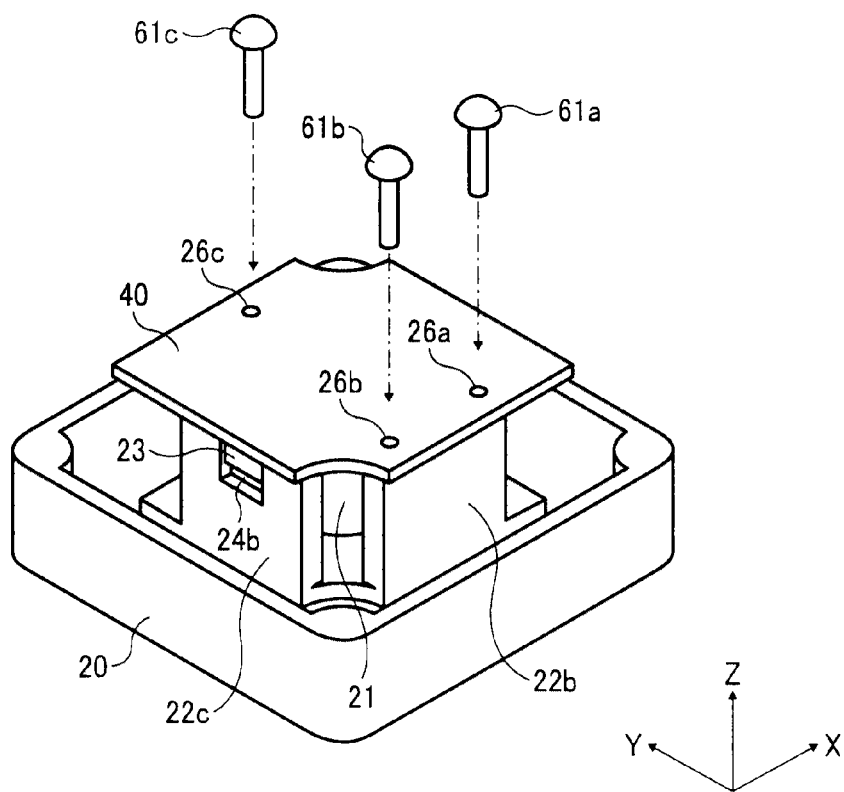
FIGS. 13A and 13B are figures illustrating a method of fixation of each of substrate joint walls of the lens cell and a substrate in Embodiment 4.
Figure 13B:
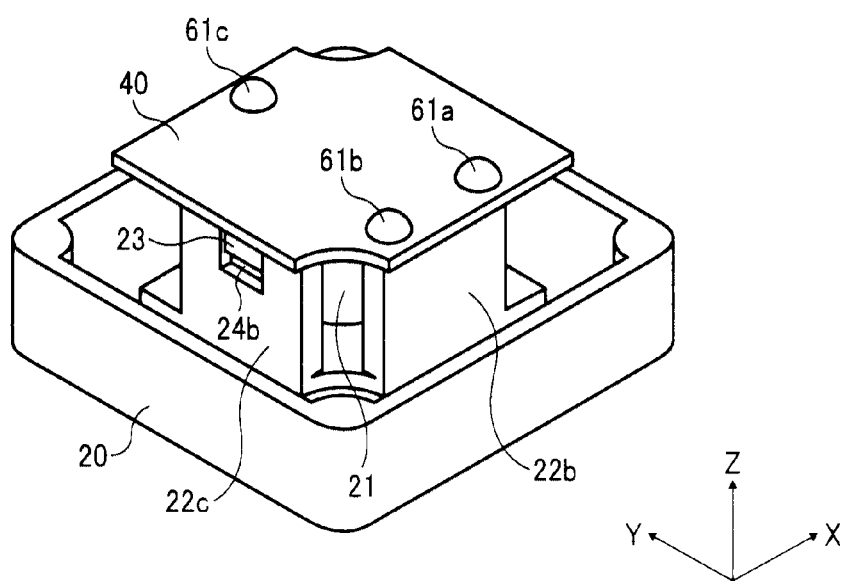

In Embodiment 4, as illustrated in FIG. 12, FIGS. 13A and 13B, pin holes 28a and 28b are formed in the substrate joint wall 22b, and a pin hole 28c is formed in the substrate joint wall 22c. And the substrate 40 is fixed to the substrate joint walls 22b and 22d by pressing pins 61a, 61b and 61c into the pin holes 28a, 28b and 28c of the substrate joint walls 22b and 22d, through the holes 26a, 26b and 26c formed in the substrate 40 respectively.

Thus, in the fixation structure of the present embodiment, when the pins 61a, 61b and 61c are pressed into the pin holes 28a, 28b and 28c formed in the substrate joint walls 22b and 22d, the substrate 40 and the lens cell 20 are fixed by pressing the pins 61a, 61b and 61c into the substrate 40 and the substrate joint walls 22b and 22d. Each of the pins 61a, 61b and 61c can be formed in a circular cylindrical shape which has a cross-sectional surface fitting in the pin holes 28a, 28b and 28c of the substrate joint walls 22b and 22d, and the holes 26a, 26b and 26c of the substrates 40, or in a shape suitable for the pin holes 28a, 28b and 28c of the substrate joint walls 22b and 22d, and the holes 26a, 26b and 26c of the substrates 40, when the pins 61a, 61b and 61c are inserted. The substrate 40 positioning adjusted with high accuracy can be strongly fixed to each of the substrate joint walls 22a, 22b, 22c and 22d of the lens cell 20 with this fixation structure, as well as Embodiment 1.

Embodiment 5

Figure 14A:
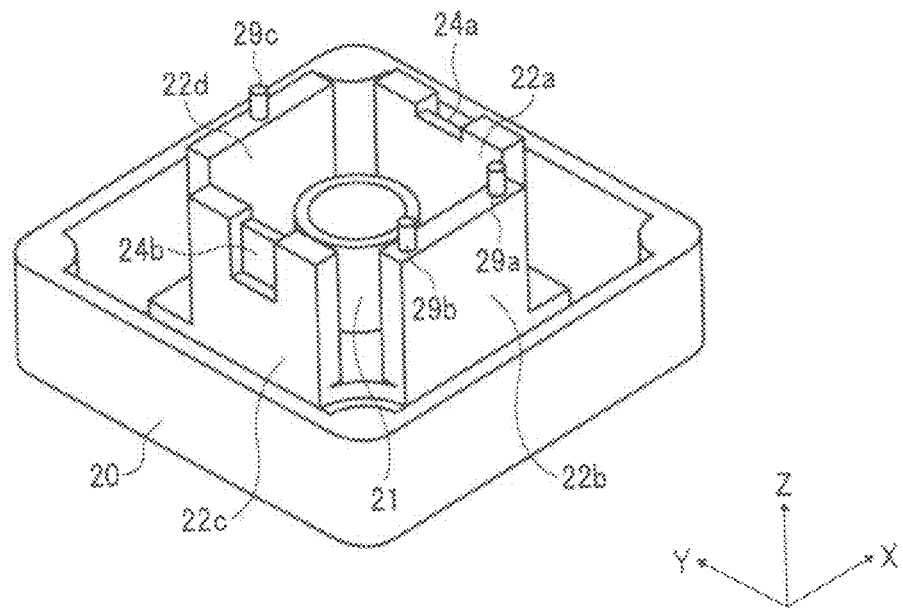
FIG. 14A is a perspective view of a lens cell viewed from a back side according to Embodiment 5 of the present invention.
Figure 14B:
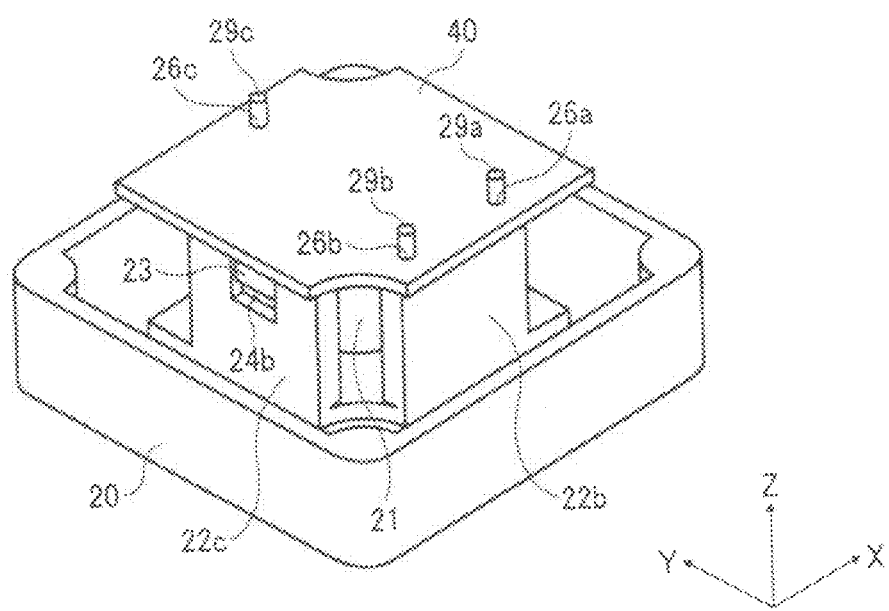
FIG. 14B is a figure illustrating a state where projection pins formed on substrate joint walls of the lens cell have been inserted through a substrate in Embodiment 5.

In a fixation structure of the present Embodiment 5, as illustrated in FIGS. 14A and 14B, projection pins 29a and 29b, a cross-section shape of each of which is a circle shape (or a polygonal shape), are formed on the substrate joint wall 22b, and a projection pin 29c, a cross-section shape of which is a circle shape (or a polygonal shape), is formed on the substrate joint wall 22d. And, the projection pins 29a, 29b and 29c are inserted through the holes 26a, 26b and 26c formed in the substrate 40 respectively.

Positions of the projection pins 29a, 29b and 29c correspond to the positions of the screw holes 25a, 25b and 25c of the substrate joint walls 22b and 22d explained in Embodiment 1 respectively. Moreover, a diameter of each of the projection pins 29a, 29b and 29c is a little smaller than that of a corresponding one of the holes 26a, 26b and 26c of the substrate 40. In this way, it can slightly move the substrate 40 and perform the positioning adjustment at a stage after the projection pins 29a, 29b and 29c have been inserted into the holes 26a, 26b and 26c of the substrate 40.

Figure 15:
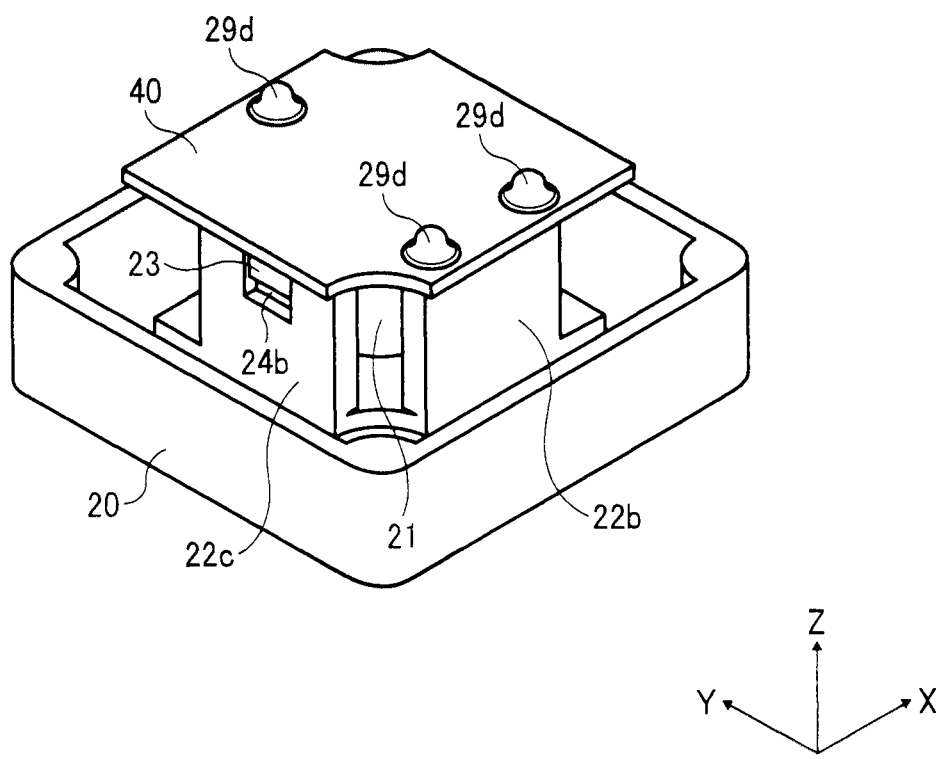
FIG. 15 is a figure illustrating a method of fixation of substrate joint walls of the lens cell and the substrate in Embodiment 5.

By the indirect bond structure explained in Embodiment 1, the substrate joint walls 22a, 22c of the lens cell 20 and the substrate 40 are indirectly joined through the joint intermediate members (not illustrated) on the bonding surface of which the adhesive (the ultraviolet curing adhesive) is applied, and the adhesive is hardened after the positioning adjustment of the substrate 40. And then, a tip section protruding from the substrate 40, of each of the projection pins 29a, 29b and 29c, is dissolved by heating. In this way, as illustrated in FIG. 15, by hardening the dissolved pin tips 29d such that the holes 26a, 26b and 26c (refer to FIG. 14B) of the substrate 40 are blocked, the substrate 40 is strongly fixed to the substrate joint walls 22b and 22d.

Thus, even if the fixation structure of the present embodiment is used, the substrate 40 positioning adjusted with high accuracy can be strongly fixed to each of the substrate joint walls 22a, 22b, 22c and 22d of the lens cell 20, as well as Embodiment 1.

Embodiment 6

Figure 16A:
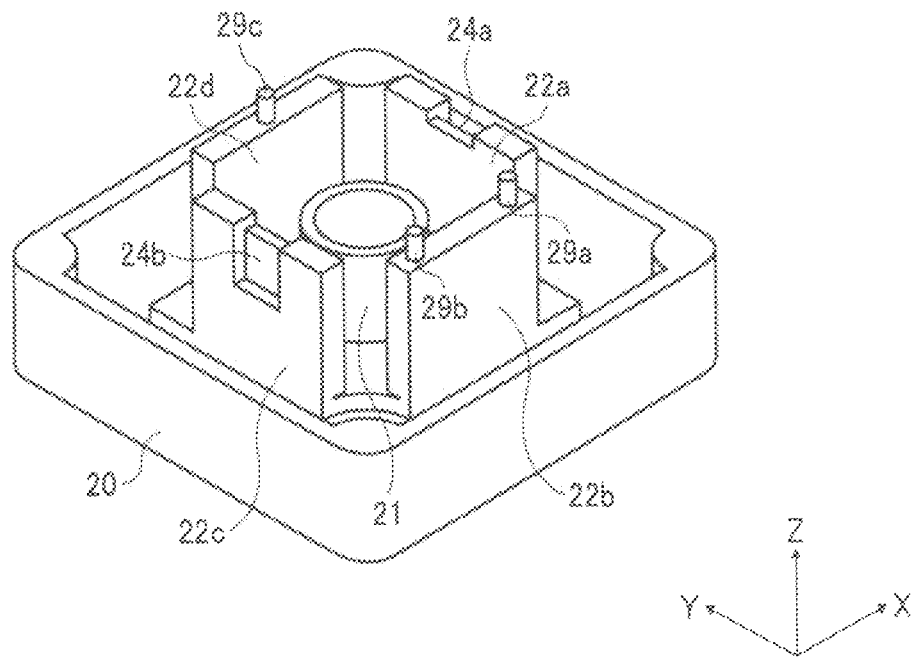
FIG. 16A is a perspective view of a lens cell viewed from a back side according to Embodiment 6 of the present invention.
Figure 16B:
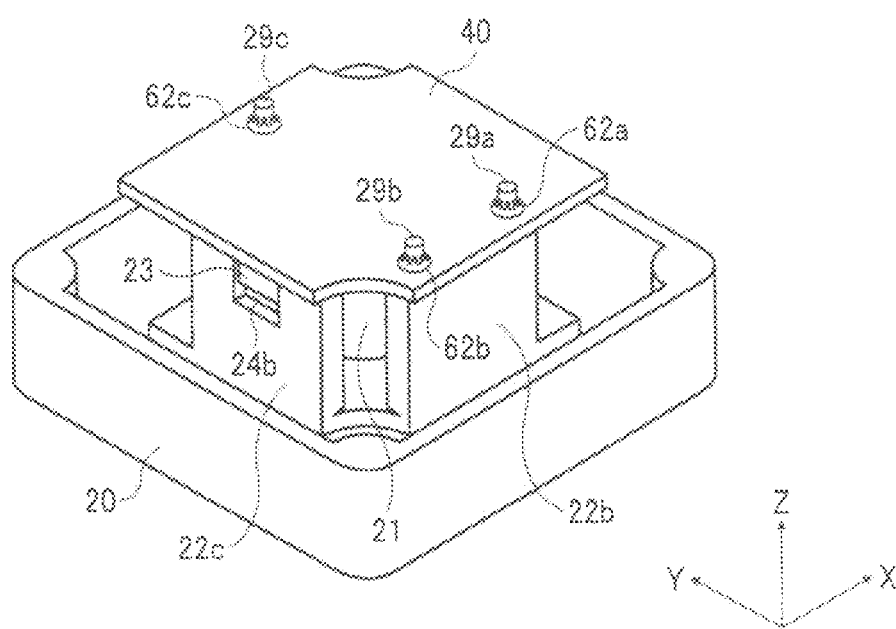
FIG. 16B is a figure illustrating a method of fixation of substrate joint walls of the lens cell and a substrate in Embodiment 6.

The fixation structure explained in Embodiment 5 is a structure in which each part projected from the substrate 40, of each of the projection pins 29a, 29b and 29c, is heated and welded after the projection pins 29a, 29b and 29c of the substrate joint walls 22b and 22d are inserted through the holes 26a, 26b and 26c of the substrate 40. In a fixation structure of the present Embodiment 6, as illustrated in FIGS. 16A and 16B, after the projection pins 29a, 29b and 29c of the substrate joint walls 22b and 22d are inserted through the holes 26a, 26b and 26c of the substrate 40, ring-shaped stoppers 62a, 62b and 62c are respectively insert to the tip parts of the projection pins 29a, 29b and 29c projecting from the substrate 40, coming into contact with a surface of the substrate 40.

Figure 17:
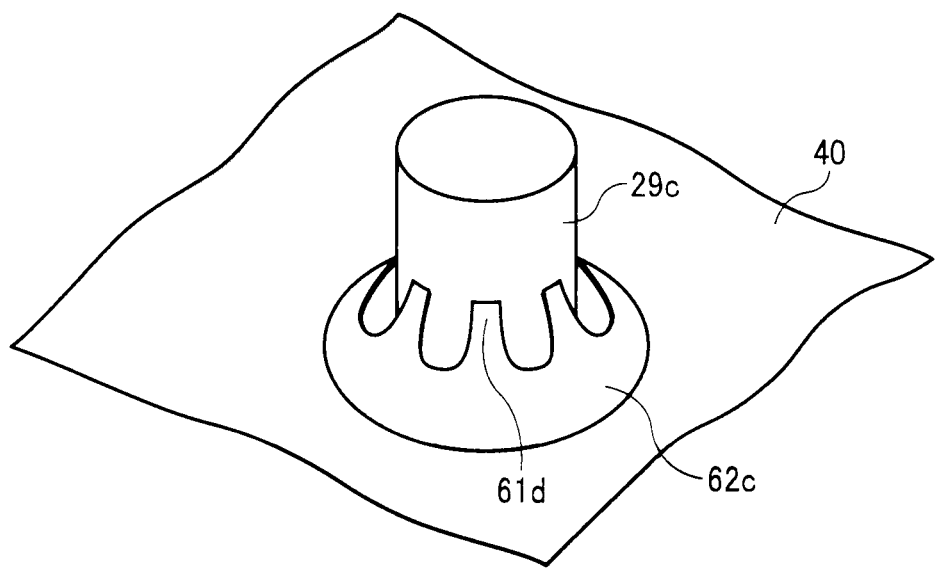
FIG. 17 is an enlarged view of a stopper used to fix a projection pin according to Embodiment 6 of the present invention.

A plurality of ribs 61d having elasticity are formed at inner surroundings of each of the stoppers 62a, 62b and 62c, as illustrated in FIG. 17. And, each of the plurality of ribs 61d is pressed and put into contact with each of outer-circumferential surfaces of the projection pins 29a, 29b and 29c in an elastic deformed state, by inserting the stoppers 62a, 62b and 62c to the projection pins 29a, 29b and 29c respectively. In this way, the substrate 40 is strongly fixed to the substrate joint walls 22b and 22d. In addition, each of the stoppers 62a, 62b and 62c can be formed in any shape only if it be capable of fitting to the corresponding one of the projection pins 29a, 29b and 29c, and have a hole in a center part which fits to the projection pin and a rib which presses and contacts the projection pin, it is possible not have to be the ring shape.

Thus, even if the fixation structure of the present Embodiment 6 is used, the substrate 40 positioning adjusted with high accuracy can be strongly fixed to each of the substrate joint walls 22a, 22b, 22c and 22d of the lens cell 20, as well as Embodiment 1. In addition, in this embodiment, it only needs to insert the ring-shaped stoppers 61a, 62b and 62c to the tip parts, of each of the projection pins 29a, 29b and 29c, projecting from the substrate 40, therefore, working time for fixation can be shortened.

Examples of a back monitor camera for a vehicle as an image-capturing device are explained in the above-mentioned embodiments. The present invention can be similarly applied to, for example, a camera in-vehicle such as a side monitor camera other than the back monitor camera, a digital still camera, a digital video camera, a portable telephone equipped with a camera, and further an image-capturing device such as a monitor camera, excluding the above-mentioned applications.

According to an image-capturing device and an in-vehicle camera of the present invention, it is possible to strongly fix positions of an imaging element and an imaging optical system under a state where the positions of the imaging element and the imaging optical system have been adjusted with high accuracy.

Therefore, even under a condition where the environment temperature changes greatly, a displacement of the imaging element with respect to the imaging optical system in the direction of the optical axis can be suppressed, an image entering through the imaging optical system is imaged on the light receiving face of the imaging element with good accuracy, and a stable and excellent image can be obtained.

It should be noted that although the present invention has been described with respect to exemplary embodiments, the invention is not limited thereto. In view of the foregoing, it is intended that the present invention cover modifications and variations provided they fall within the scope of the following claims and their equivalent.

What is claimed is:

1. An image-capturing device, comprising:
an imaging optical system which is configured to capture an optical image of a subject;
an imaging optical system retaining member which retains the imaging optical system;
an imaging element which is configured to convert the optical image into an electrical signal;
a substrate which is arranged on a back side of the imaging optical system retaining member and retains the imaging element; and
a plurality of substrate joint pieces each of which extends from the imaging optical system retaining member toward the substrate, in a surrounding of the imaging optical system,
wherein a first set of tip parts of the plurality of the substrate joint pieces on a substrate side and the substrate are joined by an indirect bond structure using at least one joint intermediate member, a first side of the joint intermediate member being adhered to one of the first set of the tip parts of the plurality of the substrate joint pieces with an adhesive and a second side of the joint intermediate member being adhered to the substrate with the adhesive,
wherein a second set of tip parts of the plurality of the substrate joint pieces on the substrate side and the substrate are joined by a fixation structure which fixes at least one of the second set of the tip parts of the plurality of the substrate joint pieces and the substrate using a fixing member at fixation positions different from bonding positions of the at least one joint intermediate member in the indirect bond structure, and
wherein outside faces of the first set of tips parts present a concave joint face, and the first side of the joint intermediate member is adhered to the concave joint face with the adhesive, a total thickness of the first side of the joint intermediate member and the adhesive being less than or equal to a depth of the concave joint face.

2. The image-capturing device according to claim 1, wherein the joint intermediate member is respectively provided to at least two of the plurality of the substrate joint pieces which are located at symmetrical positions with respect to a center of the imaging optical system, and the respective joint intermediate member is provided at symmetrical positions with respect to the center of the imaging optical system.

3. The image-capturing device according to claim 1, wherein at least two of the fixation positions are respectively provided to at least two of the plurality of the substrate joint pieces which are located at symmetrical positions with respect to the center of the imaging optical system.

4. The image-capturing device according to claim 3, wherein the at least two of the fixation positions each of which is respectively provided to one of the at least two of the plurality of the substrate joint pieces which are located at the symmetrical positions with respect to the center of the imaging optical system are arranged such that a straight line connecting the at least two of the fixation positions becomes the shortest.

5. The image-capturing device according to claim 3, wherein the fixing members are provided on a straight line which passes through the center of the imaging optical system and connects the at least two of the plurality of the substrate joint pieces which are located at the symmetrical positions with respect to the center of the imaging optical system with the shortest length, and are provided in the surroundings of the straight line.

6. The image-capturing device according to claim 1, wherein at least one rib is provided to a tip face of at least one of the plurality of the substrate joint pieces.

7. The image-capturing device according to claim 1, wherein
the fixing member is a screw,
on a tip face of at least one of the plurality of the substrate joint pieces a screw hole is provided at a position where the screw is screwed, and at a position of the substrate corresponding to the screw hole, a hole into which the screw is inserted is provided, and the screw is inserted into the hole of the substrate and is screwed to the screw hole of the at least one of the plurality of the substrate joint pieces.

8. The image-capturing device according to claim 1, wherein the fixing member is a pin, on a tip face of at least one of the plurality of the substrate joint pieces a pin hole into which the pin is pressed is provided, and at a position of the substrate corresponding to the pin hole, a hole into which the pin is inserted is provided, and the pin is inserted into the hole of the substrate and is pressed into the pin hole of the at least one of the plurality of the substrate joint pieces.

9. The image-capturing device according to claim 1, wherein a projection part projecting toward the substrate is provided at a tip part of at least one of the plurality of the substrate joint pieces, and a hole into which the projection part is inserted is provided at a position of the substrate corresponding to the projection part.

10. The image-capturing device according to claim 9, wherein the fixing member is the projection part, the projection part of the at least one of the plurality of substrate joint pieces penetrates through a penetrating hole of the substrate, and the projection part penetrated from the substrate is welded.

11. The image-capturing device according to claim 9, wherein the fixing member includes the projection part, and a stopper which is fitted to an outer circumference of the projection part penetrated from the substrate and has at least one rib with an elasticity formed in an inner circumference thereof, and the at least one rib is pressed and put into contact with the outer circumference of the projection part.

12. An in-vehicle camera comprising the imaging-capturing device according to claim 1.

13. The image-capturing device according to claim 1, wherein the adhesive which adheres the first side of the joint intermediate member to the concave joint face and the adhesive which adheres the second side of the joint intermediate member to the substrate are hardened at the same time.

* * * * *